(No Model.) 2 Sheets—Sheet 1.

E. W. JENKINS.
HARVESTING MACHINE.

No. 283,248. Patented Aug. 14, 1883.

Attest
J. D. DuBois
L. J. Mator

Inventor
Edward W. Jenkins
By his atty (No Model.) 2 Sheets—Sheet 2.

E. W. JENKINS.
HARVESTING MACHINE.

No. 283,248. Patented Aug. 14, 1883.

Attest
J. S. DuBois.
L. J. Maton

Inventor
Edward W. Jenkins
By his atty.

UNITED STATES PATENT OFFICE.

EDWARD W. JENKINS, OF NORRISTOWN, PENNSYLVANIA.

HARVESTING-MACHINE.

SPECIFICATION forming part of Letters Patent No. 283,248, dated August 14, 1883.

Application filed January 9, 1883. (No model.)

*To all whom it may concern:*

Be it known that I, EDWARD W. JENKINS, of Norristown, Montgomery county, Pennsylvania, have invented an Improvement in Harvesting-Machines, of which the following is a specification.

My invention has reference to harvesting-machines, but more particularly to reeling attachments thereon; and it consists in supporting the reel-arms or beaters within the inside limits of said arms, to enable the said reel to be rotated by a long universal-jointed rod driven from the main or driving shaft of the harvesting-machine; further, in providing means to adjust said reel horizontally or vertically with reference to the platform and finger-bar, and various details of construction, all of which are fully set forth in the following specification and shown in the accompanying drawings, which form part thereof.

Figure 1:
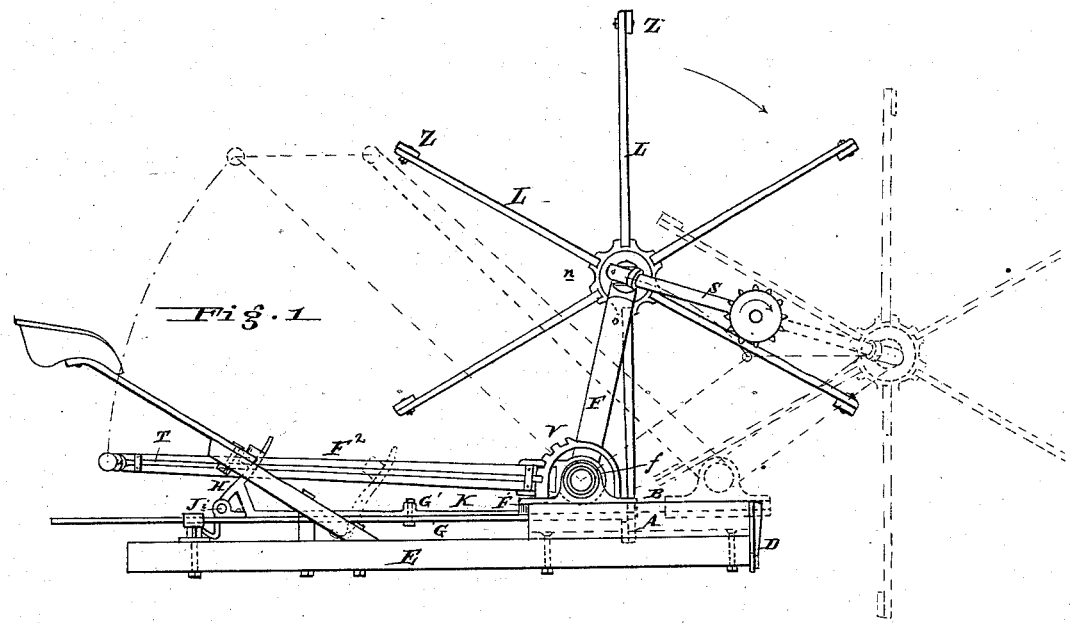
Figure 2:
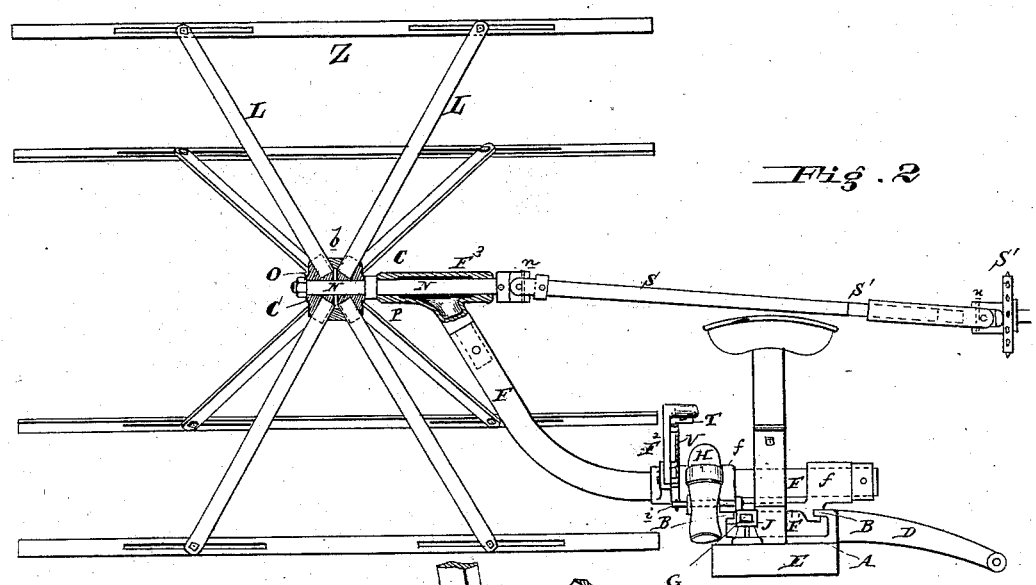
Figure 3:
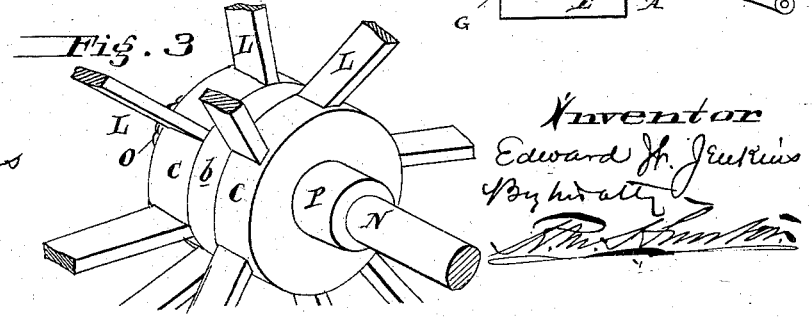
Figure 4:
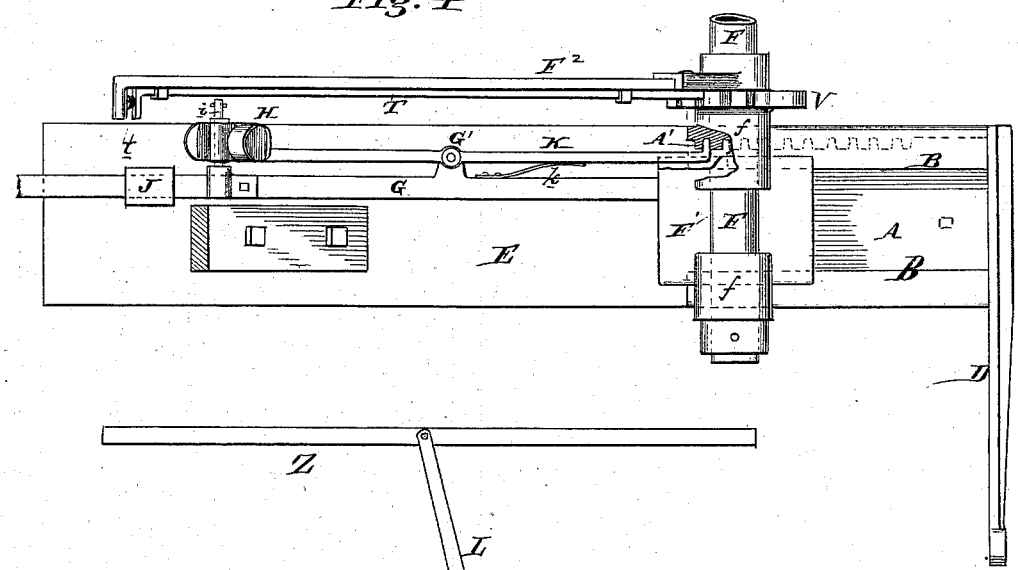
Figure 5:
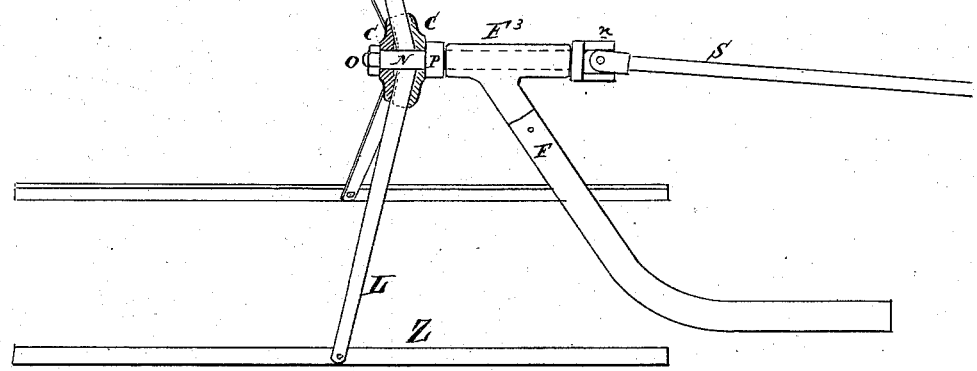

In the drawings, Figure 1 is a side elevation of my improved reel and its supporting and driving mechanism. Fig. 2 is a rear elevation of same, with the reel in section. Fig. 3 is a perspective view of the reel-hub. Fig. 4 is a plan view of the reel-support and adjusting mechanism. Fig. 5 is an elevation, with part in section, of a modified construction of reel.

A is a stationary bed-plate, provided with guides B, rack A', and projecting arm D, adapted to be bolted to the plank E of the frame of the harvesting-machine.

F is a crank-shaped reel-support, with a hand-lever, $F^2$, which works upon a horizontal axis within the bearings $f f$ on slide-block F', provided with a guide-rod, G, one end of which is fastened thereto, the outer end of which works through the guide-standard J. The stirrup H is fitted loosely upon a pin, $i$, on the rod G. The slide-block F' slides upon the guides B on the stationary casting or bed-plate A. The reel is provided with a double row of spokes or arms, L, all clamped fast by the hub, made of the two outer sections, C, and center ring, $b$, forming a clamping-hub, clamped and held together by the reel-shaft N, having a collar, P, the said shaft passing through the said sections, and provided with a nut, O, so arranged as to bolt the sections together and clamp the arms of the reel firm in their respective places around the said hub in right and left directions radiating from the axis of the reel, and upon which the slats or beaters Z may be bolted. The hub of the reel may be made in two sections, clamping one row of arms, as shown in Fig. 5. The reel-shaft N passes through the upper end of the crank-arm F, which is provided with a bearing, $F^3$, at or close to the center of gravity of the reel, and turns therein, connecting a tumbling-shaft, S, having universal joints $n$, the tumbling-shaft S being placed in a substantially horizontal position along the harvester, and driven by a sprocket-wheel, S', and a chain geared from the main wheel of the harvester, the reel being so constructed as to allow the tumbling-shaft to extend a considerable distance within its inside limits, thereby affording a sufficient length of tumbling-shaft to accommodate the deviations of the reel as it is adjusted in different positions, while the said shaft continually transmits motion to the reel. The reel, while in motion, may be placed in different positions to suit the grain by the tumbling-shaft following its change of position, as indicated by dotted lines. The reel is held to its place from slipping forward and backward by the sway-bar K, fulcrumed to the rod G at G', one end connecting with the stirrup H, and the other end engaging in the rack A' in the stationary bed-plate A, the bar being normally held in the rack by a spring, $k$. The reel is adjusted vertically by the bolt T on the hand-lever $F^2$ engaging with the segment V, which is bolted to the slide-block F' or the bearing $f$, and provided with detents to receive the bolt, which is forced therein by the aid of a spring, $t$, in the handle, and when so engaged holds the reel secure.

In case it is desired to move the reel forward or backward, the driver places his foot into the stirrup H, gives it a side motion, which throws the sway-bar K out of the rack A', where it was held, and when disengaged leaves the reel in care of the foot of the driver, to be shifted horizontally in the direction desired. When raising or lowering the reel, the driver places his hand on end around the handle of the hand-lever $F^2$, griping the hand-piece on the bolt T in the ordinary way, disconnecting the bolt from the detent in the segment V, and thus leaving the reel in care of the driver, to be raised or lowered, as the case may be, and which is readily done by raising or depressing the hand-lever F², which is rigidly secured to the reel-support or crank-arm F. By turning the said crank-support down, the driver lowers the reel, and by raising the said support by the lever F², which is depressed and held to position again by the bolt T dropping back again into the segment V, the reel may be raised. The reel may have its slats set obliquely or stand in a spiral shape, and which is often very necessary in reaping some kinds of grain. This is done by loosening the nut O and turning one of the segments C partly around.

I do not limit myself to any particular means for adjusting the reel, as the devices shown may be modified in various ways without departing from the invention. Neither do I limit myself to the method of clamping the spokes of the reel or the construction of said hub, as my invention comprehends a supporting-hub and its bearing located within the limits or ends of the reel-slats or beaters.

The hub-sections may be clamped by separate bolts from the shaft, if desired; but I prefer the construction shown.

Having now described my invention, what I claim as new, and desire to secure by Letters Patent, is—

1. In a harvesting-machine, an adjustable crank-shaped reel-support working upon a horizontal axis carried in sliding bearings, the said support being provided with a bearing for a reel on its free end, and at or near the center of gravity of said reel, the said supporting bearing being located wholly within the limits of said reel, in combination with said reel and means to adjust said support and sliding bearings, substantially as and for the purpose specified.

2. In a harvesting-machine, the combination of a reel and its shaft with a tumbling-shaft connected to said reel-shaft by a universal joint within the inside limits of the reel, and arranged in such a manner that the said shaft drives the said reel, and at the same time allows of its adjustment while in motion, substantially as and for the purpose specified.

3. In a harvesting-machine, the combination of the reel with a crank-shaped arm or support extending within the inside limits of the reel, close to its center of gravity, and receiving the shaft of said reel in horizontal bearings located within the limits of the reel, and upon which the reel revolves, and means to adjust said arm, so that the reel may be adjusted to suit the grain to be cut, substantially as and for the purpose specified.

4. In a harvesting-machine, a reel, in combination with a hub located at or near the longitudinal center or within the inside limits of said reel, the said hub supporting the reel arms or spokes obliquely from the axis of the reel, a tumbling shaft reaching over within the inside limits of the reel, and connecting therewith by means of a universal joint, and means to adjust said reel vertically or horizontally, as desired, and while the reel is in motion, substantially as and for the purpose specified.

5. In a harvesting-machine, a reel provided with a supporting-bearing at or near its center of gravity, and within the limits of the reel, in combination with means to support said reel through the agency of said bearing, substantially as and for the purpose specified.

6. The combination of a reel with its shaft N, universal joint n, tumbling-shaft S, bearing F³, crank-arm F, bearings f, slide-plate F', guides B, rack A', arm K, pivoted at G', foot-rest H, lever F², bolt T, and rack V, substantially as and for the purpose specified.

In testimony of which invention I hereunto set my hand.

EDWARD W. JENKINS.

Witnesses:
R. M. HUNTER,
R. S. CHILD, Jr.